Figure 1:
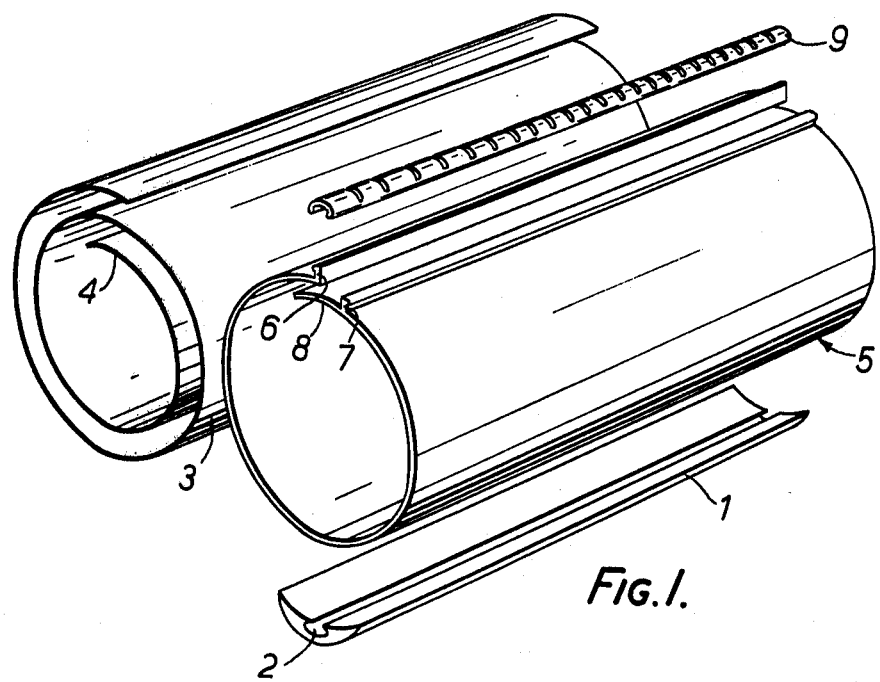

United States Patent [19]

Corke et al.

[11] 4,283,239
[45] Aug. 11, 1981

[54] BRACING METHOD

[75] Inventors: Nicholas T. Corke, Linden; Christian A. M. Debbaut, Lubbeek, both of Belgium

[73] Assignee: N.V. Raychem S.A., Kessel-Lo, Belgium

[21] Appl. No.: 12,016

[22] Filed: Feb. 14, 1979

[30] Foreign Application Priority Data

Feb. 21, 1978 [GB] United Kingdom ............... 6906/78

[51] Int. Cl.³ .................... B29C 27/00; B32B 31/00
[52] U.S. Cl. ........................................ 156/85; 156/86; 174/84 R; 174/DIG. 8
[58] Field of Search ............... 156/85, 86; 174/84 R, 174/85, 91, 120 R, 120 C, 121 R, 121 G, 121 C, DIG. 8

[56] References Cited

U.S. PATENT DOCUMENTS

| 3,035,113 | 5/1962 | Danchuk | 174/DIG. 87n |
| 3,235,289 | 2/1966 | Jones | 156/86 |
| 3,455,336 | 7/1969 | Ellis | 138/156 |
| 3,946,143 | 3/1976 | McCoughlin | 174/84 R |
| 4,142,592 | 3/1979 | Brusselmans | 156/86 |

Primary Examiner—Caleb Weston
Attorney, Agent, or Firm—Lyon & Lyon

[57] ABSTRACT

A method of bracing an article, especially a junction between conduits subject to an internal pressure greater than that of their surroundings, which comprises applying thereto, in the order listed, a gas-impermeable member (this step may be omitted), a reinforcing member and a heat-recoverable member, the reinforcing member being radially inwardly deformable, at least at elevated temperatures, and heating the assembly to cause recovery of the heat recoverable member.

21 Claims, 2 Drawing Figures

BRACING METHOD

This invention relates to a method of bracing an article subject to distortion to prevent or reduce the distortion, especially an article forming a covering for a conduit junction.

It has previously been proposed, for example in British Patent Specification No. 1,431,167 published Apr. 7, 1976, in the name of N. V. Raychem S.A., to provide as assembly for protecting and insulating a junction between conduits, which comprises a relatively rigid longitudinally split tube of internal diameter such that the tube will accommodate the junction, relatively rigid support means for the split tube, and a heat-shrinkable sleeve of length greater than the length of the tube with the support means, at least part of the inner walls of the heat-shrinkable sleeve having applied thereto sealing material such that, on shrinking the sleeve down over the junction, the end regions of the sleeve which shrink down over the conduits are sealed thereto.

The assembly is employed by positioning over a junction between conduits the split tube and the support means, and shrinking the heat-shrinkable sleeve over the junction surrounded by the split tube and support means, the length of the sleeve being such that its ends recover over the conduits, the sealing material on its internal surface sealing the tube to the conduits.

It has also been proposed, in U.S. Ser. No. 955,537 in the name of Jean-Marie Etienne Nolf, filed on Oct. 30, 1978, to provide a heat-recoverable article which comprises a heat-shrinkable tubular sleeve having an inner lining of a continuous thin metal foil and provided, if desired, with central reinforcing means comprising one or more longitudinally compressible coils.

Where two or more conduits enter a junction from the same side, the heat-shrinkable sleeve may be clipped together between them to provide the necessary sealing, as described, for example, in U.S. patent application entitled "Branch-Off Method", filed on Dec. 27, 1978, in the name of Jeane-Marie Etienne Nolf Ser. No. 973,614.

While the above described arrangements have met with approval for certain uses, they have not proved entirely satisfactory when the conduits covered are maintained at superatmospheric pressure, since there is a tendency to bulge under the pressure. An increase in the wall thickness of the shrinkable sleeve to counteract this pressure makes the process of shrinking more difficult and the success of sealing less certain.

The present invention provides a method of bracing an article liable to distortion, which comprises first applying to a distortable surface of the article a reinforcing member, and then recovering a heat-recoverable member over the reinforcing member, whereby the reinforcing member is caused to conform more closely to the configuration of the distortable surface of the article.

Because the reinforcing member may be applied in such a way that it initially generally conforms to the surface, the recovery of the recoverable member need not cause any significant change in the configuration of the reinforcing member and there need be little, if any, resulting decrease in its reinforcing strength.

The invention also provides a method of covering a junction between conduits subject to an internal pressure greater than that of their surroundings, which comprises applying to the junction, in the order listed, a substantially gas-impermeable member, a reinforcing member and a heat recoverable member, the reinforcing member being radially inwardly deformable, at least at the recovery temperature of the heat recoverable member, and heating the assembly to cause recovery of the heat recoverable member.

The invention is particularly applicable to the bracing of an article liable to radial expansion under pressure, although it is not to be taken as being limited thereto.

The reinforcing member may comprise a fibrous mat, especially a glass or carbon fibre mat, impregnated with a meltable material, e.g., a thermosetting or thermoplastic material, preferably a hot-melt adhesive. Preferred members will be described in more detail below. The size and shape of the reinforcing member, and of the heat-recoverable member, will depend to a large extent on the size and shape of the article to be braced. Where the article is a junction between cables which is generally tubular with tapered ends, the reinforcing member is advantageously a rectangular sheet, of width sufficient to extend across the junction to the tapered portions, and of length sufficient to be wrapped around the junction to give at least two layers of covering around the whole circumference. The sheet is preferably wrapped tightly about the junction. When heat is applied to cause shrinkage of the heat-recoverable member, it generally also causes melting of the thermoplastic, or hot-melt adhesive, but without destroying the coherence of the reinforcing member as a whole, the reinforcing member conforming to the shape of the article being braced and bonding to form a continuous coherent layer between the article and the outer, heat-recovered, member.

The heat-recoverable member is advantageously a sleeve, preferably a wrap-around sleeve, for example a sleeve as described and claimed in British Patent Specification No. 1,155,470, in the name of Raychem Corporation, published June 18, 1969. The length of the sleeve, like that of the reinforcing member, should be sufficient to cover the whole length of the region subject to distortion under pressure which, in the case of junctions of the type described above, extends some way along the tapered portions. The sleeve may have an internal coating of sealant, e.g. a hot-melt adhesive. If desired, the ends of the recoverable sleeves may be provided with support rings, which provide a substantially constant, preferably circular, outer cross-section along their length while having a sloping inner surface to complement the shape of the tapered portions of the surface to be braced. The rings are advantageously split into two or more segments, hinged together if desired.

The junction to be braced may itself be covered by a wrap-around sleeve of the type described in British Patent Specification No. 1,155,470. The opposite edges or edge regions of this sleeve are provided with upstanding rails, which are placed in abutment and held together against recovery forces by a channel. It is desirable, when carrying out the bracing method of the invention, to smooth out the profile of the channel and rails before applying the reinforcing sheet, and accordingly there may be provided a flexible elongate member having a longitudinal groove of a shape complementary to that of the channel and rails, the elongate member being applied over the channel and rails beneath the reinforcing member.

The preferred reinforcing member comprises, as indicated above, a glass fibre mat impregnated with a thermoplastic material. The length of the fibres, and their arrangement, should be such that on heating the mat becomes sufficiently flexible that it can be caused to conform closely to the contours of the article to be braced, while still retaining cohesion. Woven or tied strand mats are preferred. The mat should be such that it allows penetration of the thermoplastic material into the interstices, but these should not be so large as to reduce the reinforcing effect. It is believed, though the invention is in no way to be regarded as limited in any way by theoretical considerations, that the fibres lying in a circumferential direction around a cable junction, and the components of other fibres in the circumferential direction, together giving a high hoop strength, account for the effectiveness of the preferred fibre mat reinforcement. This is enhanced by the employment of a double layer, which contributes to the avoidance of any slip which may otherwise tend to give a region or line of weakness at the overlap if only a single layer were applied.

A suitable fiber mat has been found to be the Syncoglas: Isoglas Type 70 S. This has a thickness of 0.2 mm and a weight of 145 g/m$^2$.

The reinforcing member may be provided with a continuous film, which assists in reducing air penetration; the film is advantageously positioned on the face of the member closer to the article subject to expansion.

The thermoplastic is advantageously a hot-melt adhesive for example one of those disclosed in British Patent Specification No. 1,440,810, in the name of Raychem Corporation, published June 30, 1976, British Patent Application No. 21467/76, filed, May 24, 1976 and DT-OS No. 27 23 116, published Dec. 8, 1977, the two last mentioned applications being in the name of N. V. Raychem S.A., and which correspond to U.S. patent application Ser. No. 798,479, U.S. Pat. No. 4,181,775.

The mat, or if desired, a plurality of mats, with their predominant fibre directions at angles, e.g., two at right angles, may be impregnated by any suitable method, for example by forming a laminate of hot-melt adhesive, or other thermoplastic, on each face of the mat and applying heat and pressure to cause molten or softened material into the interstices between the fibres.

Figure 2:
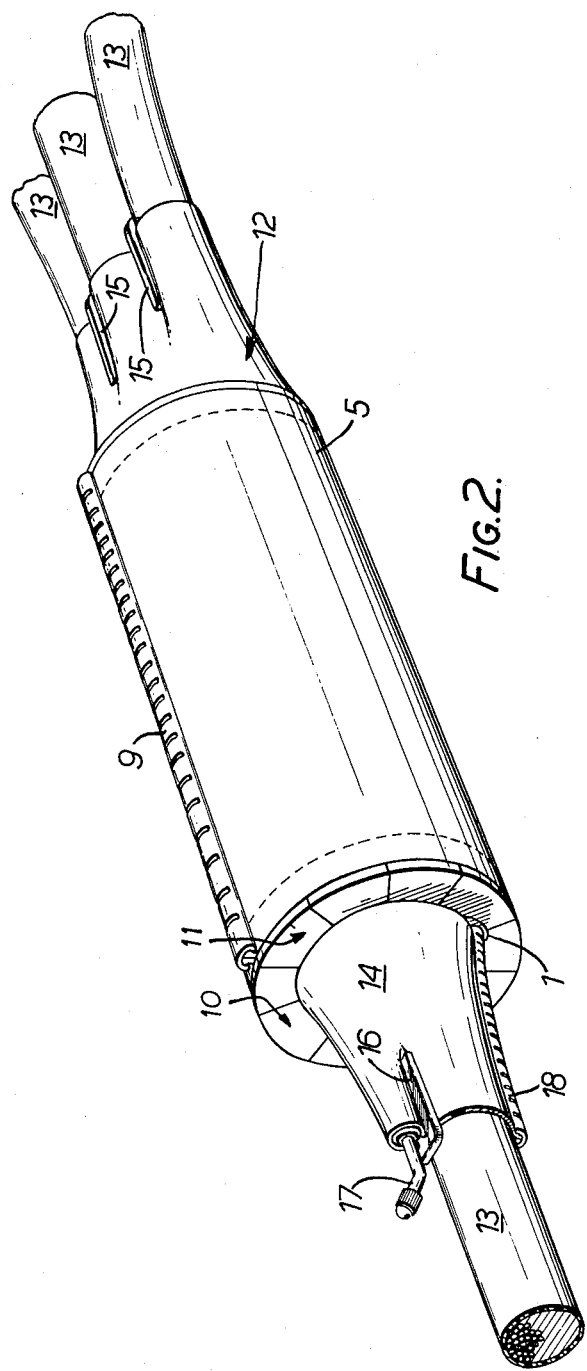

One way of carrying out the method of the invention will now be described in greater detail, by way of example only, with reference to the accompanying drawings, in which FIG. 1 shows various members used in the method before application; and FIG. 2 shows a cable junction braced by the method.

Referring now to the drawings, and more especially to FIG. 1, there are shown a flexible elongate member 1, having a longitudinal groove 2, a sheet 3 of hot-melt adhesive having a glass fibre reinforcement 4, and a wrap-around heat-recoverable sheet indicated generally by the reference numeral 5. The interior of the sleeve 5 may have a layer of adhesive or sealant (not shown). The sheet has a first rail 6 at one edge, and a second rail 7 spaced from the opposite edge by a flap 8. In use, a channel 9 is placed over the rails 6 and 7.

Referring now more especially to FIG. 2, there is shown a cable junction indicated generally by the reference numeral 12. The junction 12, between cables 13, has been covered by a wrap-around sleeve 14 as described in British Patent Specification No. 1,155,470 having an aluminium foil layer to reduce its gas and water permeability, the sleeve having been recovered over a split tube and support rings (not shown) as described in British Patent Specification No. 1,431,167.

Between the cables 13 entering at one end are clips 15, and at the other end is a further clip 16 which provides a seal between the cable 13 and a valve 17, through which the interior of the junction 12 may be pressurized. The longitudinal edges of the sleeve 14 are retained in abutment by the channel 18.

Also shown in FIG. 2 is a split ring, the two segmented halves 10, 11 of which are positioned at one end of the cable junction 12, a similar ring (not shown) being positioned at the other end.

In use, the elongate member 1 is first positioned over the channel 18. The split ring 10, 11 and the corresponding ring for the other end are next positioned over the tapered portions at each end of the junction 12. The sheet 3 is then wrapped around the junction 12 and over the rings to give two layers over the whole of the circumference.

The sheet 5 is then positioned over the rings and the channel 9 applied to the rails 6 and 7. The sheet is then heated to cause its recovery, and heating continuous to ensure that the sheet 3 has been softened enough to cohere as a mass, and has been pressed against the sleeve 14 sufficiently to cause it to conform closely to its contours.

A test of the ability of the method of the invention to provide resistance to expansion under pressure was carried out by enclosing an 80 mm diameter pipe provided with saw cuts and a pair of apertures, extending over a length of 100 mm, to simulate a joint between two pipes.

Positioned over the simulated joint is a 200 mm long laminate, comprising four layers, applied in the following sequence:

(a) a hot melt adhesive (b) aluminium foil (c) a hot melt adhesive with a single mat of glass fiber, and (d) a heat-shrunk sleeve.

At 23° C. the bursting pressure of the laminate was in excess of 16 bar, and at 70° C., the pressure at burst was 5 bar, which occurred by the ballooning of the sleeve, followed by bursting.

When the experiment was repeated but using a double mat in layer (c), failure at 70° C. did not take place until a pressure of 8 bar had been reached. Similar results were obtained when the layer (b) was a heat-shrunk sleeve.

In contrast, when pressure was applied to a simulated joint enclosed only by the application of a hot melt adhesive and a heat-shrunk sleeve, in that order, the pressure at burst, at 23° C. was 8 bar, and at 70° C., 2 bar, failure occurring by ballooning in each case.

What we claim is:

1. A method of bracing a junction between cables which, in use, are pressurized, which comprises the steps of applying to the junction, in the order listed, a first sleeve, a substantially gas-impermeable member, which is subject to distortion by the internal pressure, a reinforcing member comprising a fibrous mat impregnated with a meltable material, and a second, heat-shrinkable sleeve, the reinforcing member being radially inwardly deformable at least at the recovery temperature of the second sleeve, and heating to recover the second sleeve.

2. A method as claimed in claim 1, wherein the first sleeve is a heat-shrinkable sleeve and is applied by heat-recovery thereof.

3. A method of covering a junction between conduits subjected to an internal pressure greater than that of their surroundings, which method comprises: applying to the junction an assembly comprising a substantially gas-impermeable member that is subject to distortion by said internal pressure, a sleeve having upstanding rails, said rails being held in abutment by a channel, and a reinforcing member applied around said sleeve; applying a heat-recoverable member to said assembly, said reinforcing member being radially-inwardly deformable at least at the recovery temperature of said heat-recoverable member; and heating said heat-recoverable member to effect recovery thereof.

4. A method of bracing a junction between cables which, in use, are internally pressurized, which comprises the steps of applying to the junction, in the order listed, a first sleeve that is substantially gas-impermeable member and which is subject to distortion by the internal pressure, a reinforcing member comprising a fibrous mat impregnated with a meltable material, and a second, heat-shrinkable sleeve, the reinforcing member being radially inwardly deformable at least at the recoverable temperature of the second sleeve, and heating to shrink the second sleeve.

5. A method as claimed in claim 4, wherein the material of the fibres of the mat is selected from the group consisting of glass and carbon.

6. A method as claimed in claim 4, wherein the meltable material is a thermoplastic material.

7. A method as claimed in claim 4, wherein the meltable material is a hot-melt adhesive.

8. A method as claimed in claim 4, wherein the meltable material is a thermosetting material.

9. A method as claimed in claim 4, wherein the heating is sufficient to cause the meltable material to melt.

10. A method as claimed in claim 4, wherein the reinforcing member is such that it provides two layers of reinforcement.

11. A method as claimed in claim 3, wherein the heat-recoverable member is a sleeve.

12. A method as claimed in claim 4, wherein the second sleeve is a wrap-around sleeve.

13. A method as claimed in claim 4, wherein the second sleeve has an internal coating of sealant.

14. A method as claimed in claim 13, wherein the sealant is a hot-melt adhesive.

15. A method as claimed in claim 4, wherein support rings are positioned within the ends of the recoverable sleeve, which rings provide a substantially constant outer cross-section along their length and have frusto-conical inner surfaces, whose apices are beyond the ends of the sleeve.

16. A method as claimed in claim 4, wherein the rings are split into at least two segments.

17. A method as claimed in claim 16, wherein the segments are hinged together.

18. A method as claimed in claim 4, in which said substantially gas-impermeable sleeve comprises a wrap-around sleeve having upstanding rails, said rails being held in abutment by a channel.

19. A method as claimed in claim 3, which also comprises applying over the channel and rails a flexible elongate member having a longitudinal groove of a shape complementary to that of the channel and rails.

20. A method as claimed in claim 3, wherein the reinforcing member comprises a fibrous mat impregnated with a meltable material.

21. A method as claimed in any of claims 1, 3, or 4, comprising the further step of applying to said junction a further member to provide a water-impermeable barrier.

* * * * *